United States Patent
Estevez et al.

(10) Patent No.: US 10,177,955 B2
(45) Date of Patent: Jan. 8, 2019

(54) IN AND RELATING TO COMMUNICATION NETWORK RESOURCING

(71) Applicant: Samsung Electronics Co., Ltd, Gyeonggi-do (KR)

(72) Inventors: David Gutierrez Estevez, Middlesex (GB); Maziar Nekovee, Middlesex (GB); Mehrdad Shariat, Middlesex (GB); Milos Tesanovic, Middlesex (GB); Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/582,517

(22) Filed: Apr. 28, 2017

(65) Prior Publication Data
US 2017/0324604 A1 Nov. 9, 2017

(30) Foreign Application Priority Data
May 3, 2016 (GB) .................................. 1607680.4

(51) Int. Cl.
*H04L 27/34* (2006.01)
*H04B 7/0413* (2017.01)
(Continued)

(52) U.S. Cl.
CPC ....... *H04L 27/3405* (2013.01); *H04B 7/0413* (2013.01); *H04L 5/0023* (2013.01);
(Continued)

(58) Field of Classification Search
CPC .. H04B 7/0452; H04B 7/0617; H04B 7/0408; H04B 2201/70702; H04L 5/0023;
(Continued)

(56) References Cited

U.S. PATENT DOCUMENTS

| 7,953,418 B2* | 5/2011 | Chen | H04W 72/087 |
| | | | 370/230 |
| 9,144,024 B2* | 9/2015 | Miyata | H04W 52/0258 |
| | (Continued) | | |

FOREIGN PATENT DOCUMENTS

EP 1887814 A2 2/2008

OTHER PUBLICATIONS

Jeanette Wannstrom, et al., "Heterogeneous Networks in LTE", available at http://www.3gpp.org/tehnologies/keywords-acronyms/1576-hetnet, 8 pages.
(Continued)

*Primary Examiner* — Rahel Guarino (57) ABSTRACT

A base station is configured to communicate with at least a first user equipment (UE) and a second UE, wherein the base station is configured to communicate with the first UE using a first modulation scheme, and with the second UE using a second, different, modulation scheme, wherein communications with the first and second UEs are arranged to be substantially orthogonal to each other. A method of allocating resources in a communication network comprising a base station operable to communicate with a first user equipment (UE) and a second UE, the method comprising using a first modulation scheme for communication with the first UE, and using a second, different, modulation scheme for communication with the second UE, wherein communications with the first and second UEs are configured to be substantially orthogonal to each other.

20 Claims, 10 Drawing Sheets

(51) Int. Cl.
*H04L 5/00* (2006.01)
*H04L 5/14* (2006.01)
*H04L 27/00* (2006.01)

(52) U.S. Cl.
CPC ........ *H04L 5/1453* (2013.01); *H04L 27/0008* (2013.01); *H04L 27/34* (2013.01); *H04L 27/345* (2013.01); *H04L 27/3416* (2013.01)

(58) Field of Classification Search
CPC .. H04L 5/0025; H04W 16/28; H04W 52/243; H04W 72/04; H04W 72/1257; H04W 74/006; H04W 52/247; H04W 72/044; H04W 72/046; Y02D 70/1226; Y02D 70/1242; Y02D 70/1244; Y02D 70/1262; Y02D 70/1264; Y02D 70/142; Y02D 70/146; Y02D 70/12; H04J 11/005
See application file for complete search history.

(56) References Cited

U.S. PATENT DOCUMENTS 9,596,053 B1* 3/2017 Marupaduga ......... H04L 1/0015
9,716,572 B2* 7/2017 Lou ....................... H04L 5/0023
2015/0358194 A1 12/2015 Yu et al.

OTHER PUBLICATIONS

Sungnam Hong, et al., "A Modulation Technique for Active Interference Design under Downlink Cellular OFDMA Networks", 2014 IEEE Wireless Communication and Networking Conference, Apr. 6-9, 2014, 6 pages.

Younsun Kim, et al., "Full Dimension MIMO (FD-MIMO): The Next Evolution of MIMO in LTE Systems", IEEE Wireless Magazine, Jun. 2014, 9 pages.

Combined Search and Examination Report dated Jan. 20, 2017 in connection with British Application No. 1607680.4, 8 pages.

* cited by examiner

IN AND RELATING TO COMMUNICATION NETWORK RESOURCING

CROSS-REFERENCE TO RELATED APPLICATION AND CLAIM OF PRIORITY

The present application is related to and claims the benefit under 35 U.S.C. § 119(a) of an United Kingdom patent application No. 1607680.4 filed on May 3, 2016 in the United Kingdom Patent Office, the entire disclosure of which is hereby incorporated by reference.

TECHNICAL FIELD

The present disclosure relates to resource allocation in a telecommunication network. It particularly, but not exclusively, relates to allocation of different modulation techniques within the same network. It more particularly concerns the allocation of resources to quadrature-amplitude-modulation (QAM) and Feher's QAM (FQAM) resources in a 5G network, but may be applied on other settings as required.

BACKGROUND

QAM modulation has been widely employed in many wired/wireless standards, such as LTE® and WiFi®. It is well known that inter-cell interference (ICI) in conventional cellular networks employing orthogonal frequency division multiple-access (OFDMA) with QAM tends to approach a Gaussian distribution. Recently, FQAM has been proposed in a downlink cellular OFDMA network instead of conventional QAM and it has demonstrated a significant performance gain for an interference-intensive scenario. The reason for the gain is because the distribution of the ICI plus additive noise (hereafter denoted as ICI for simplicity) received at the victim cell deviates from Gaussian distribution when FQAM is employed at the interfering cells, known as aggressors. Since Gaussian distribution of the noise is the worst-case distribution in wireless networks with respect to the channel capacity, the performance of the victim cell can be improved due to the deviation from the Gaussian distribution. In other words, performance for a user experiencing heavy interference from neighboring aggressors can be boosted if the aggressors utilize FQAM instead of QAM.

However, FQAM cannot simply be used constantly, since it introduces other drawbacks, such as decreased data throughput, so it should be deployed selectively.

The distribution of ICI in FQAM depends largely on the number of aggressors. The lower the number of aggressors, the larger is the deviation from Gaussian distribution, so that the greater the performance improvement at the victim cell is. With an increased number of aggressors, the distribution of FQAM ICI asymptotically approaches Gaussian distribution, according to the central limit theorem. Thus the capacity improvement is no longer significant.

In order to make the ICI deviate from Gaussian distribution as far as possible, all aggressors should employ FQAM. However, as mentioned previously, FQAM only achieves improved performance when the mobile device or User Equipment (UE) experiences high level of interference. For those UEs experiencing medium or low level of interference, QAM modulation outperforms FQAM. In this regard, when there are multiple UEs with different interference level but co-existing in the same cellular network and sharing the same resources, the resources allocated to FQAM and QAM should be orthogonal. In the context of this application, 'orthogonal' refers to the ability of two or more modulation schemes to co-exist in some way, without interfering with one another. For instance, as an analogy, literal orthogonality is provided in an optical system whereby horizontally and vertically polarized light signals may co-exist in space and time, without interfering. This is a literal orthogonal relationship. In the radio frequency domain, the term orthogonal refers to some property which provides the same degree of isolation without requiring any form of literal orthogonality.

SUMMARY

It is an aim of embodiments of the present disclosure to address problems with prior art systems, whether mentioned herein or not. It is a particular aim to provide an improvement in resource allocation techniques.

To address the above-discussed deficiencies, it is a primary object to provide an apparatus and method as set forth in the appended claims. Other features of the disclosure will be apparent from the dependent claims, and the description which follows.

Embodiments of the disclosure address problems in the prior art by extending the available resource space in new dimensions—e.g. space or time—by incorporating advanced beamforming algorithms or revising already established procedures, e.g. use of Almost Blank Sub-frames (ABS).

Beamforming is a signal processing technique used in wireless communications for directional signal transmission or reception. Multiple beams can be formed to transmit multiple data streams orthogonal to each other, and then different modulation schemes can be employed separately in each beam. Therefore beams can also be regarded as resources, which creates a new degree of freedom to dimension FQAM and QAM resources in an orthogonal manner. Embodiments of the disclosure can therefore be applied in many scenarios as follows, alongside or instead of conventional techniques in the frequency or time domain.

Orthogonality can be provided in the space domain. This can be achieved by providing Full-dimension MIMO (FD-MIMO), as known in the art. This allows the interference avoidance capabilities of beamforming and a practical implementation of massive MIMO that places antennas in a 2D array panel where every antenna is an active element. It can further be achieved by mm-wave beam scheduling, which is a scheme to schedule the beam directions to avoid mutual interference, in order to maximize the utility function, e.g., spectrum efficiency.

Orthogonality can also be provided in the time domain. For instance, in heterogeneous networks, where macro cells and small cell co-exist in the same spectrum and, thus, macro cells generate interference in the small cells. ABS is implemented to keep macro cells silent during certain sub-frames so that the small cells do not experience strong interference. In other words, the resources allocated to macro and micro cells are orthogonal.

In some embodiments, a base station is configured to communicate with at least a first user equipment (UE) and a second UE, wherein the base station is configured to communicate with the first UE using a first modulation scheme, and with the second UE using a second, different, modulation scheme, wherein communications with the first and second UEs are arranged to be substantially orthogonal to each other.

In some embodiments, a method of allocating resources in a communication network comprising a base station operable to communicate with a first user equipment (UE) and a second UE, the method comprising using a first modulation scheme for communication with the first UE, and using a second, different, modulation scheme for communication with the second UE, wherein communications with the first and second UEs are configured to be substantially orthogonal to each other.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any processor including at least one microprocessor or microcontroller, device, system or part thereof that controls at least one operation, such a device may be implemented in hardware, firmware or software, or some combination of at least two of the same.

It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Figure 1A:
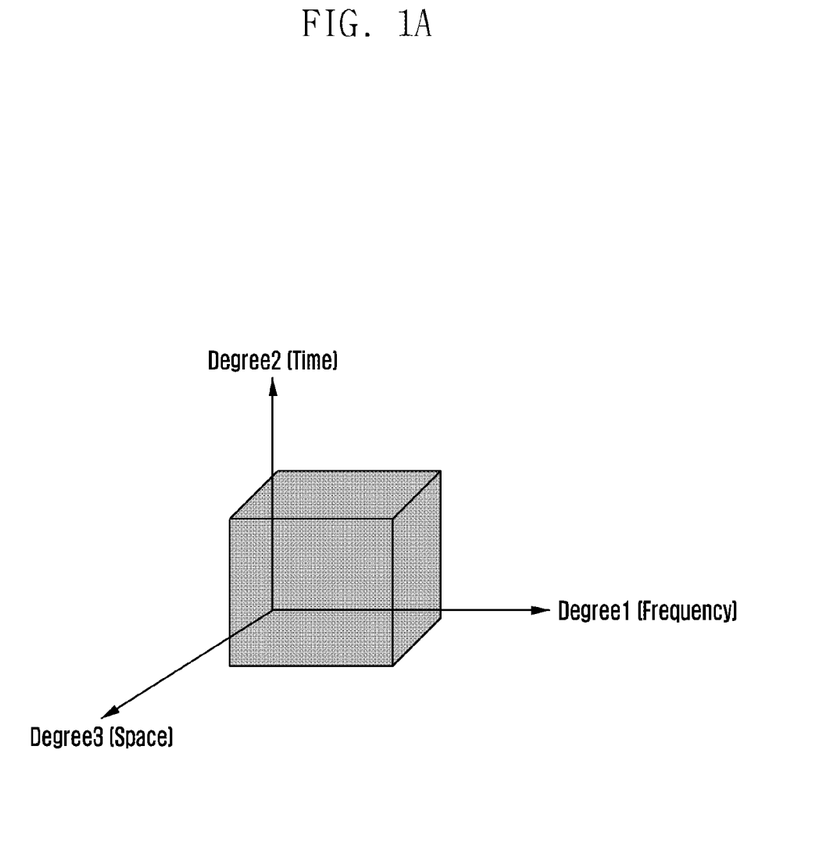
FIGS. 1A to 1D show example representations of resource slicing or allocation in different domains to achieve orthogonality according to the present disclosure.
Figure 1B:
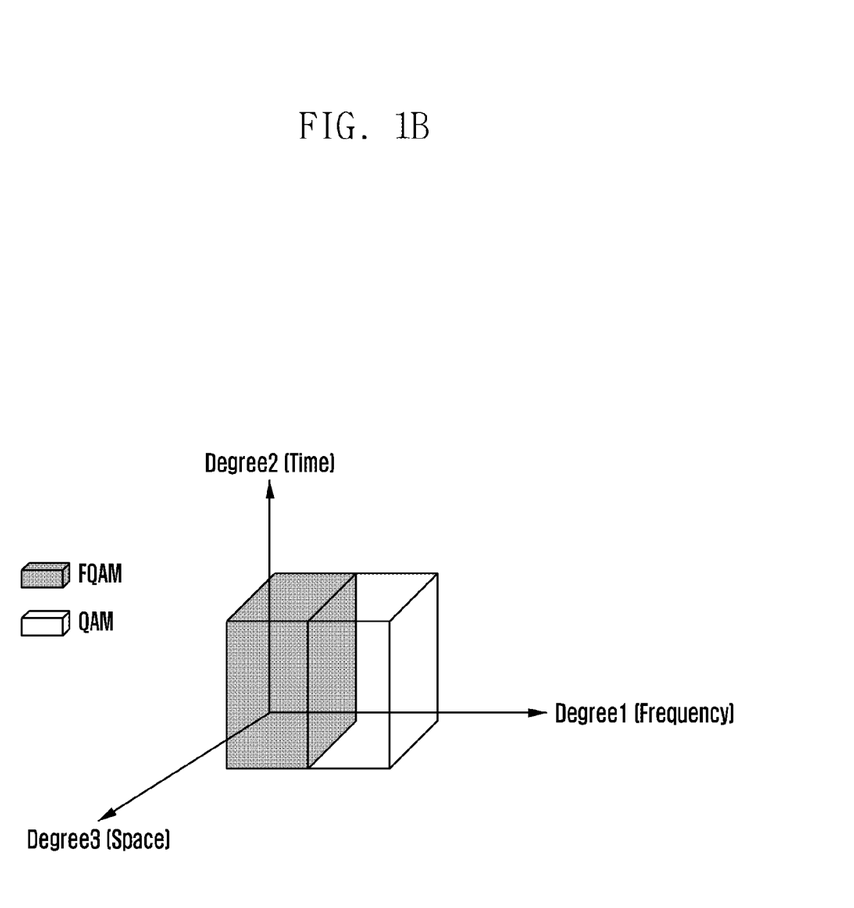

FIGS. 1A-1D represent a multiple dimensional resource space where the cube represents available resources. In FIG. 1a, there is a single large cube, defined by the mutually orthogonal axes: Frequency, time and space. The entire cube conceptually represents all the available resource, which is, in this instance, dedicated to FQAM FIG. 1B shows the available resource split into two components in the frequency domain, with one component dedicated to QAM and the other dedicated to FQAM in an orthogonal manner. In this scenario, a first set of frequencies is uses QAM and a second, non-overlapping, set of frequencies uses FQAM.

Figure 1C:
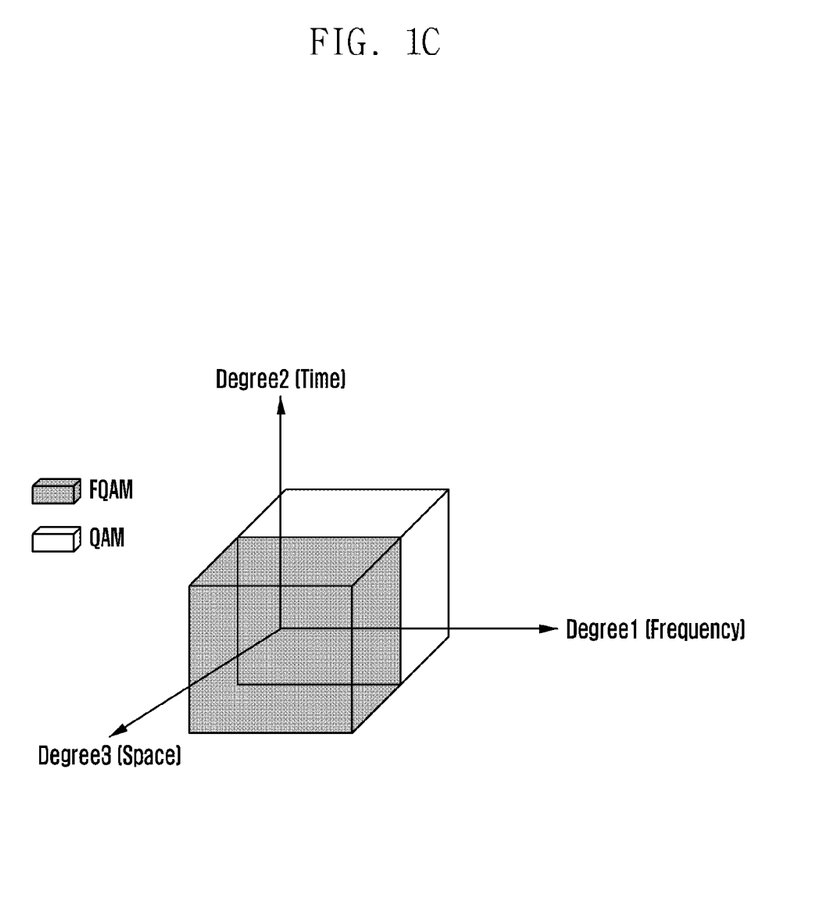

FIG. 1C shows the available resource split into two components in the space domain, with one component dedicated to QAM and the other dedicated to FQAM in an orthogonal manner. In this domain, each component represents a beam, which can co-exist in the same time and frequency domain, with the necessary orthogonality provided spatially by the beams physically occupying different spaces. This can be realized by multi-stream MIMO, e.g., FD-MIMO.

Figure 1D:
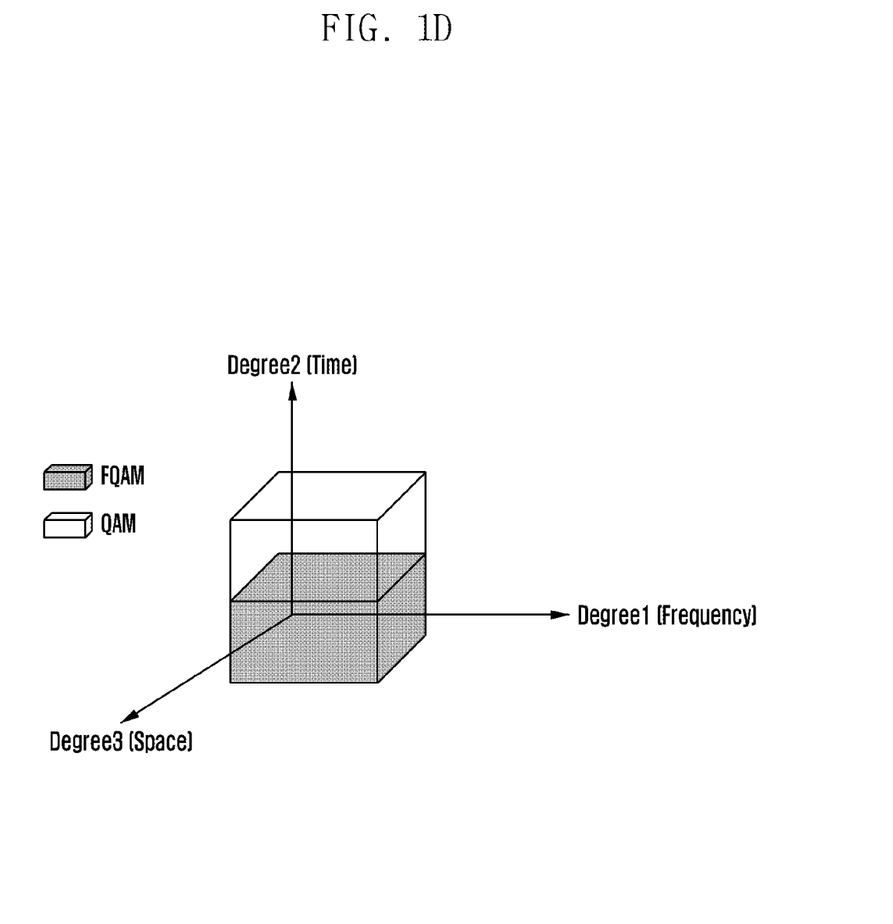

FIG. 1D shows the available resource split into two components in the time domain, with one component dedicated to QAM and the other dedicated to FQAM in an orthogonal manner. This may be implemented in a similar manner to Almost Blank Sub-frames (ABS). Instead of keeping a macro cell completely silent in certain subframes, a new type of subframe, referred to herein as an Interference Resistant Subframe (IRS) wherein macro cells are allowed to transmit using FQAM so that the UEs in the small cells still receive interference but they are more robust, and able to operate in the presence of the interference because of the use of FQAM.

In an embodiment, all beams from all cells causing interference to their respective neighboring cells would employ FQAM to contribute to a deviation of the interference distribution from a Gaussian distribution, thereby improving performance in such an environment.

In another embodiment, FQAM is applied to only a subset of the interfering beams in the network with the purpose of maximizing spectral efficiency of the system, where the number and selection of base stations utilizing FQAM may be obtained using many different methods, examples of which follow.

Applying FQAM to beams whose 'victim' cannot null the interference. One example of this is the case where in the 'victim' cells, there is a certain number of affected ('victim') users who cannot use beamforming (BF) but have omnidirectional receivers instead. Another example is the case where the 'victim' users could null the interference but are using spatial degrees of freedom for spatial multiplexing.

Applying FQAM to beams whose 'victim' is static (i.e. not moving)

Applying FQAM to beams whose 'victim' is static, while taking into account the atmospheric conditions and the frequency bands being used.

Applying FQAM to beams whose 'victim' is currently using a critical service (e.g. uMTC).

Applying FQAM to beams whose 'victim' is experiencing interference from a certain number of interferers, this number being below a certain threshold.

Further, in another embodiment, FD-MIMO is employed, where active antenna elements allow dynamic and adaptive precoding to be performed jointly across all antennas, hence enabling 3D beamforming. With the capabilities of vertical beamsteering (also known as downtilt adaptation), 3D beamforming can dynamically adjust the beam direction according to the location of each user such that the received signal power for each user can be maximized. With respect to the interference caused to users of neighboring cells, FD-MIMO can exploit the flexibility of the downtilt adaptation to further reduce interference arising from scheduled users which need to be served for fairness reasons.

Figure 2:
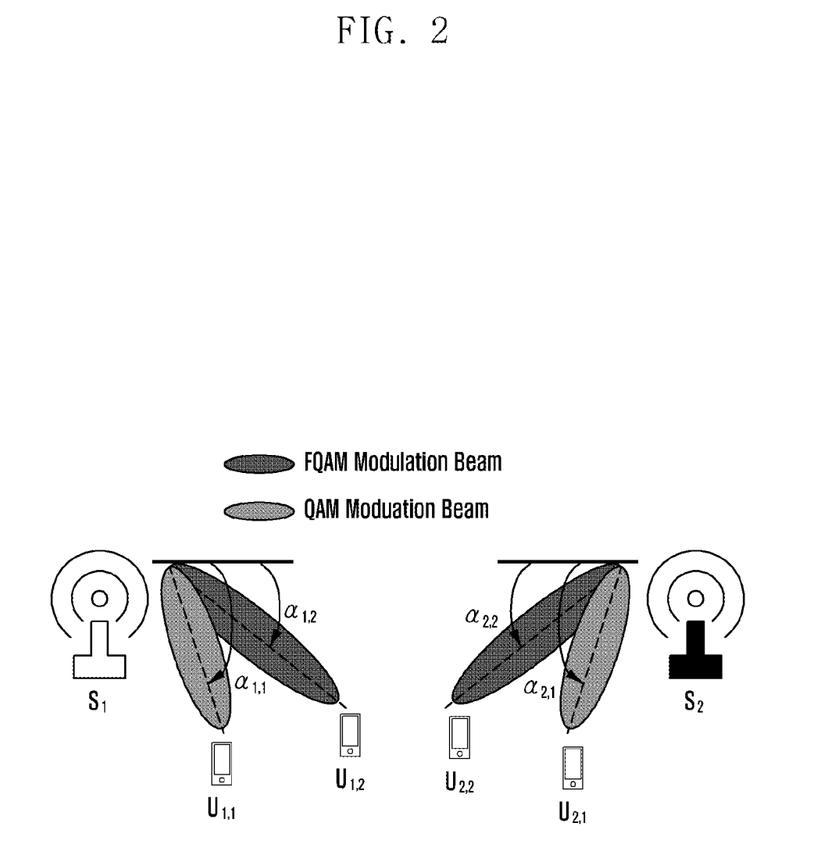
FIG. 2 shows a schematic representation of FD-MIMO based beamforming according to the present disclosure.

In FIG. 2, base stations $S_1$ and $S_2$ are applying FD-MIMO to serve their users. Thanks to the vertical beamforming capabilities, different beams can be used to serve users who could be in the same horizontal angle but different vertical angles. In that case only vertical beams causing interference to users of neighboring cells would need to employ FQAM.

In the example of FIG. 2, beams directed to users $U_{1,2}$ and $U_{2,2}$ (possibly at the cell edge) would employ FQAM, since these beams are likely to cause mutual interference, However, users $U_{1,1}$ and $U_{2,1}$ would be served using a QAM modulation, since these beams would be spatially separated.

In a refinement of the embodiment shown in FIG. 2, and focusing on a single cell, both the zenith angle (as in the previous embodiment) and the azimuth angle are taken into account when deciding on the FQAM/QAM split. More specifically, if the angular spacing between the two users in a single cell ($U_{1,1}$ and $U_{1,2}$) is smaller than the beam "granularity" (in other words, orthogonality is violated or the beams would overlap), then both streams use FQAM. In an application of a previous embodiment, FQAM can be applied to all of the beams in a cluster (cluster being defined by a certain zenith and azimuth and linked to the size of antenna array and its implementation—e.g. the type of beamforming, its "granularity" etc.), so long as the size of said cluster (number of users within it) is below a certain threshold. Similar considerations could be made for the uplink (UL)—use FQAM for UL transmission of those UEs where full orthogonality of the beams at the receiver (BS) cannot be ensured.

In another embodiment, beam scheduling may be used, where perfect orthogonality in the space dimension may be extremely difficult to achieve, especially in the case of highly densified small cell and user deployment, i.e., some of the users could still suffer inter-cell interference (ICI) from adjacent small cells. In addition, fairness has not been taken into consideration. For instance, if a user is in a location where it could easily receive interference from other small cells, there is a high chance that no beam will be scheduled for this particular user for a long period.

In another embodiment, a new subframe, i.e., IRS defined previously, is defined in heterogeneous networks where macro and small cells use the same spectrum. Instead of keeping a macro cell completely silent in certain subframes, macro cells are permitted to transmit using FQAM so that the UEs in the small cells are more robust to the interference.

Embodiments of the present disclosure are arranged to allocate or slice resources to provide orthogonality in one or more of the possible domains. The description herein refers to time, space and frequency domains, although others may also be possible. In the following description, attention is focused on the space domain, by way of example only, but the skilled person will appreciate that the same or similar principles apply in other domains.

As a result of highly directive transmission and reception in systems employing beamforming, it is unlikely that a user receives ICI from a large number of interfering small cells, which makes FQAM a suitable solution to tackle the problem of ICI in such a case. When a small cell is able to transmit multiple data streams via multiple beams, different modulation schemes can be used depending on the interference situation. For example, QAM and FQAM may be used for high and low interference cases, respectively, as shown in FIG. 3.

Figure 3:
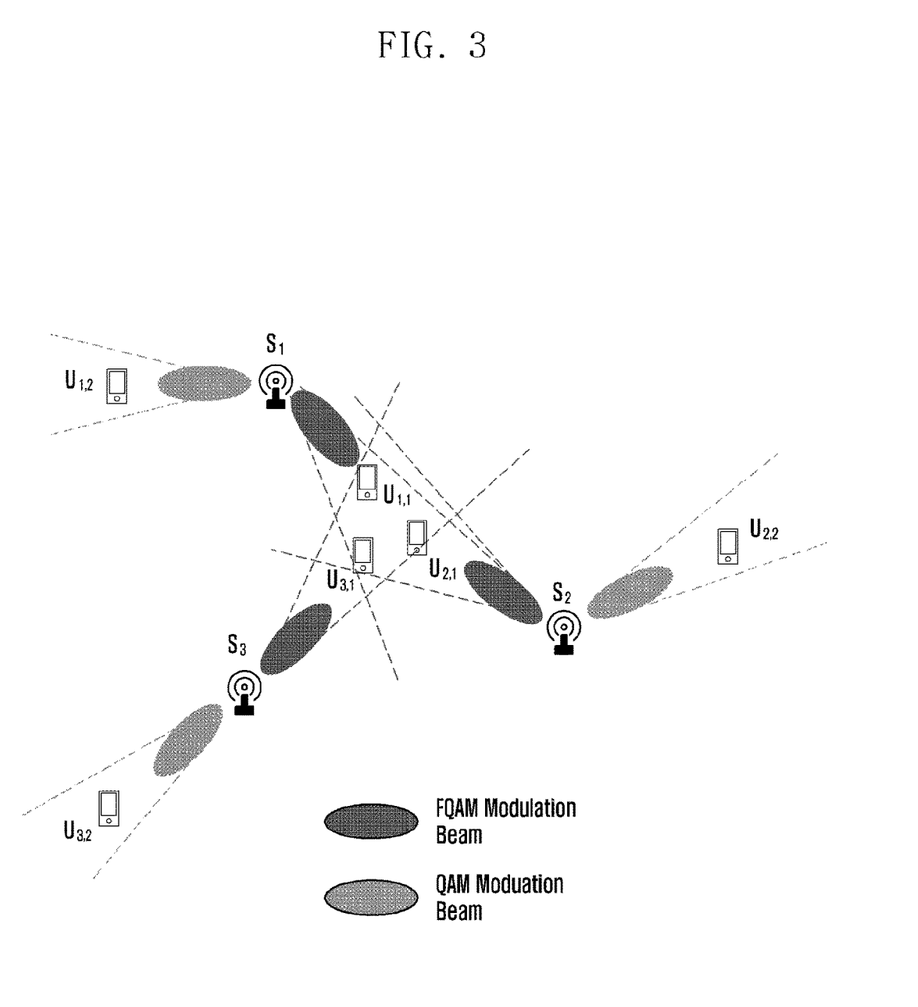
FIG. 3 shows a network topology experiencing symmetric interference.

In FIG. 3, each cell transmits using two independent beams to two different UEs, e.g., S1 to $U_{1,1}$ and $U_{2,1}$; S2 $U_{2,1}$ and $U_{2,2}$; and S3 to $U_{3,1}$ and $U_{3,2}$. Some of the beams, shown as the lighter shaded beams, do not cause interference, since they do not overlap with other beams. On the contrary, other beams, shaded more darkly, cause interference to other UEs when transmitting to the associated UE, due to their overlapping spatial positions. For example, the darker beam transmitted from S3 generates interference to $UE_{1,1}$ and $UE_{2,1}$ while transmitting to its own associated $UE_{3,1}$. While at the same time, $UE_{3,1}$ also suffers from the interference generated by S1 and S2. Since UEs associated with the darker beams are located in the overlapping area, each cell is an aggressor as well as a victim in such a scenario. Therefore FQAM is activated for all darker beams to achieve improved performance, since this is a scenario where a relatively high level of interference is experienced and all UEs can benefit from the use of FQAM here. However, for the UEs receiving the lighter shaded beams, the use of QAM is enabled, since the interference issues do not arise and superior performance can be achieved without needing to use FQAM.

Figure 4:
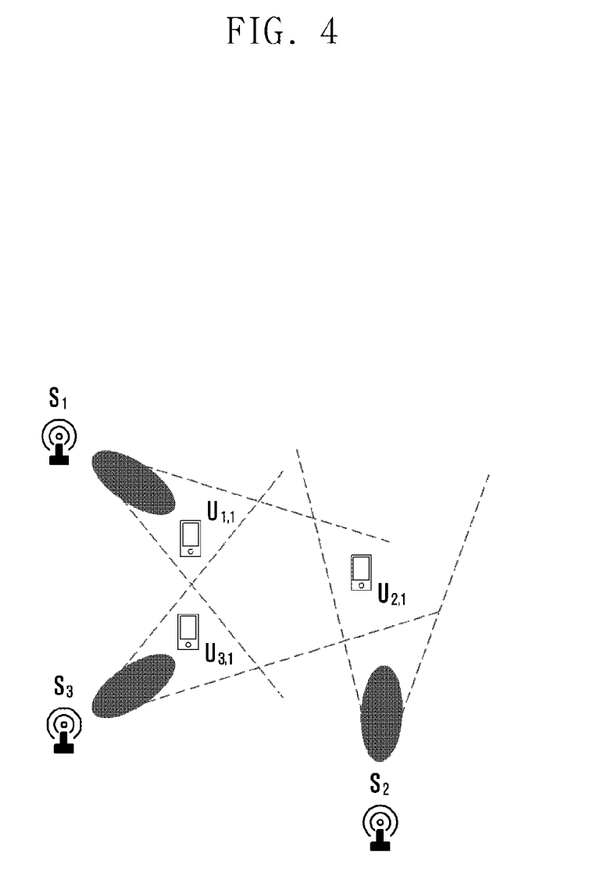
FIG. 4 shows a network topology experiencing asymmetric interference.

FIG. 3 represents an interference-symmetric case in the sense that each aggressor is also a victim so that by activating FQAM each small cell (SC) can benefit. However, interference is not always symmetric. The activation of FQAM reduces spectral efficiency in terms of bps/Hz due to the integration of FSK. In a directional transmission scenario, when the interfering beams switch from QAM to FQAM to enhance the rate of the victim UE, the transmission rates to their own associated UEs might be reduced. This scenario is illustrated in FIG. 4.

As can be seen, base stations S1 and S3 generate interferences to $U_{2,1}$ associated with S2, but S2 does not generate interference to the UEs—$U_{1,1}$ and $U_{3,1}$—associated with S1 and S3, respectively. In order to improve the performance of $U_{2,1}$, S1 and S3 should switch from QAM to FQAM. However, by doing this, the transmission rates from S1 to $U_{1,1}$ and S3 to $U_{3,1}$ are adversely affected by the switching, since they are now using FQAM, rather than QAM, with its superior bitrate performance. Therefore, in as interference-asymmetric case, as illustrated in FIG. 4 and described above, a trade-off needs to be made, which takes into consideration the overall performance of the entire network, since certain UEs will benefit and certain other UEs will suffer. The exact balance to be adopted may differ, depending on the specific circumstances. Examples of such trade-offs and the balance to be struck are discussed below.

A switching threshold, where modulation is switched from QAM to FQAM may be defined. Two important factors may be taken into consideration as follows:

Overall interference level: FQAM should only be activated in an interference intensive scenario because QAM typically outperforms FQAM when the interference level is low.

Number of aggressors: as mentioned, performance improvement associated with FQAM is due to the deviation from Gaussian distributed ICI to non-Gaussian distributed ICI. A large number of aggressors will only cause minor deviation so that the performance improvement at the victim cell is also minor.

Based on above observations, two thresholds may be defined. Firstly, $\gamma_{th}$ is defined as the threshold SINR as a trigger. However, it should be emphasized that if the SINR is lower than the threshold (i.e. $\gamma<\gamma_{th}$), then this does not necessarily lead to FQAM switching.

Another threshold, the number of aggressors $N_{th}$, may be defined and a comparison of the number of aggressors N with $N_{th}$ may be made. Only if the number of aggressors is lower than the threshold (i.e. $N<N_{th}$) does FQAM switching happen. The second threshold $N_{th}$ is to ensure that the deviation is large enough to provide significant gain to the network. Collecting information such as current SINR and number of aggressors and IDs of the aggressors or beams of aggressors may be performed by using the current LTE cell selection/reselection procedure, which may be used to identify the overall interference level and number of main aggressors by measuring signal strength of aggressor reference signals whose location in the time-frequency resource grid can be identified in system information.

The mechanism for switching to/from FQAM/QAM may be performed in one of two possible ways—in a centralized or a distributed manner. In order to describe these techniques, it is useful to define two parameters used in this process:

Local service priority level $SP_1$: this indicates the priority level of the local service at the cell, which could be a function of the user quality of experience (QoE). For example, for some critical data, the service priority could be very high but for services like web browsing the service priority could be relatively low.

Rate margin $R_m$: this indicates how much rate loss a cell can tolerate without sacrificing QoE. For example, a cell could provide 1 Gbps to a user but if the rate were reduced by half, this wouldn't significantly affect the user's QoE. However, a reduction by a half of a lower rate could severely affect the user's QoE.

Figure 5:
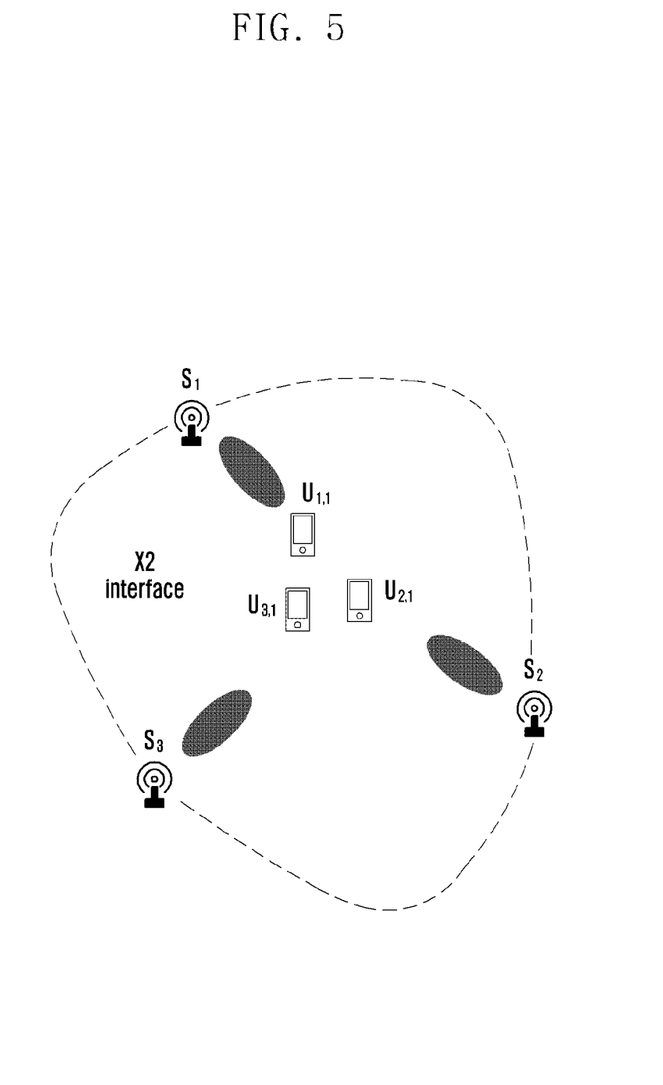
FIG. 5 shows a schematic representation of an embodiment employing deploying a distributed switching mechanism according to the present disclosure.

In a distributed switching mechanism, as illustrated in FIG. 5, once the UE detects that the current SINR γ is below the threshold $γ_{th}$ and number of aggressors N is smaller than $N_{th}$, it will pass the information to the victim SC, e.g., S1. Then the victim cell S1 communicates and coordinates with aggressors, e.g., S2 and S3, via the X2 interface. The victim cell S1 first sends two signals to S2 and S3:

1) FQAM activation request, and
2) service priority level $SP_1$.

Upon the reception of the request, S2 and S3 perform a local calculation to obtain the rate loss $R_{los}$ which would be experienced by switching to FQAM and compare this loss with the rate margin $R_m$. If rate loss $R_{los}$ is smaller than the rate margin $R_m$, S2 and S3 will accept the request, since the UE will not experience a significant lowering of QoE. Otherwise, they can compare the service priority of S1 with local priority values. If the local service has a higher priority value, S2 and S3 can reject the request; otherwise, they will accept the request. In any event, S2 and S3 send a feedback message to S1, also via the X2 interface.

This mechanism works in a distributed manner in the sense that all the decisions are made locally and when asymmetric interference occurs, there is no guarantee that the global performance of the entire network can be optimized, since each cell acts effectively in its own interest by communicating only with neighboring cells.

Figure 6:
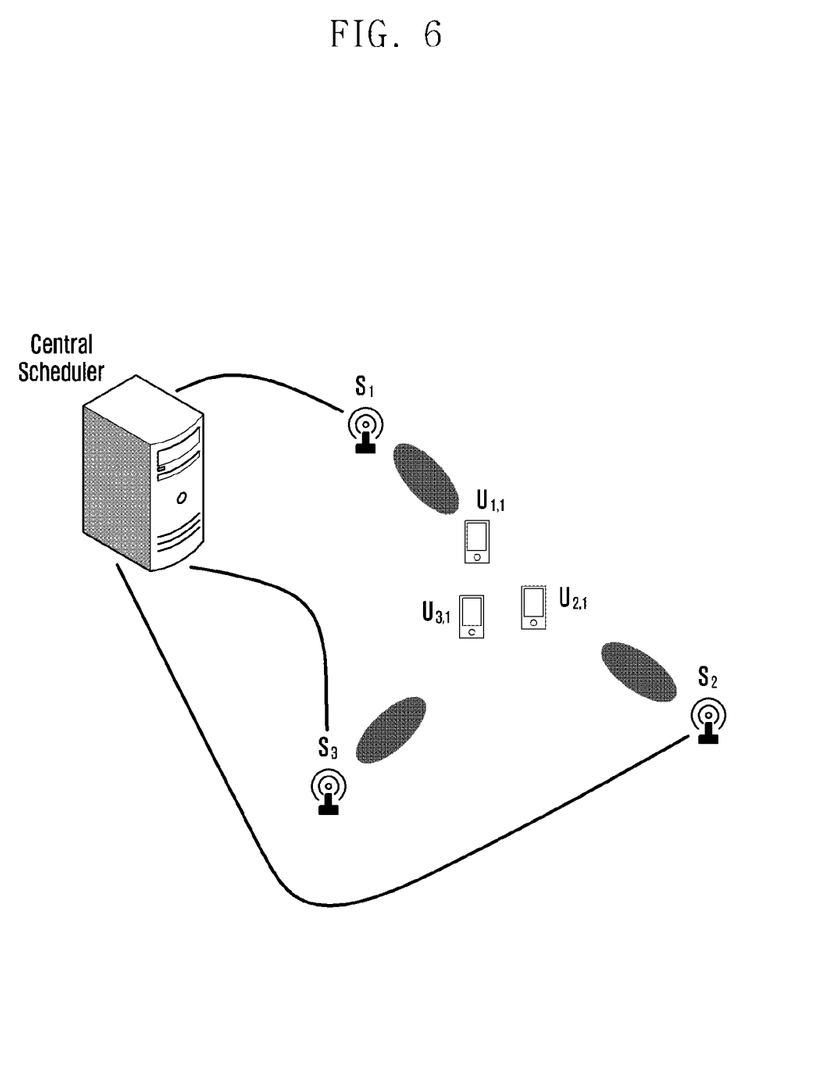
FIG. 6 shows a schematic representation of an embodiment employing deploying a centralized switching mechanism according to the present disclosure.

In an alternative embodiment to the distributed mechanism described above, a centralized approach applies a central scheduler which coordinates all the SCs by sharing a limited set of information. This is illustrated in FIG. 6. This technique makes the algorithm applicable to a non-ideal backhaul (i.e. one experiencing a relatively limited capacity and relatively higher level of latency) between SCs and the central scheduler. Once the UE detects higher interference and low number of aggressors, it informs the victim SC and the victim SC then passes information, e.g., interference level and IDs and local service priorities of the aggressor/aggressor beams and victim cell/beams to the central scheduler. The central scheduler then makes a decision regarding optimizing the global performance of the entire network subject to certain service priorities. Then, on the basis of this decision, the central scheduler informs the individual SCs whether or not to activate FQAM.

In a greedy case, i.e. where an attempt is made to optimize every connection across the network, the central scheduler maintains a table of all beams and chooses FQAM/QAM to optimize the global performance as shown in the below table.

TABLE I

Example of global optimization

|  | SC1 | SC2 | SC3 | SC4 | ... | ... | SCN |
|---|---|---|---|---|---|---|---|
| Beam 1 | F | Q | Q | F | ... | ... | Q |
| Beam 2 | Q | F | F | F | ... | ... | Q |
| Beam N | F | Q | F | Q | ... | ... | F |

Key:
F: FQAM;
Q: QAM

In the centralized mechanism, illustrated in FIG. 6, optimization is a NP-hard combinatorial problem that requires very high calculation complexity but can be addressed by using some sub-optimal optimization algorithms. It should be noted that the centralized mechanism cannot typically be applied to a large number of SCs, since it will incur high complexity even with sub-optimal solutions. The number of the SCs involved in centralized mechanism also has a strong impact on complexity. In simple terms, a smaller number of SCs generally means a lower level of complexity and vice versa.

Generally speaking, in embodiments of the disclosure, a hybrid approach is adopted, i.e., it consists of both distributed and centralized mechanisms. And switching between the two mechanisms may happen based on current complexity requirements and quality of the backhaul links to reach a satisfactory balance between performance and complexity. The balance may depend on specific network requirements, defined on a case-by-case basis.

Figure 7:
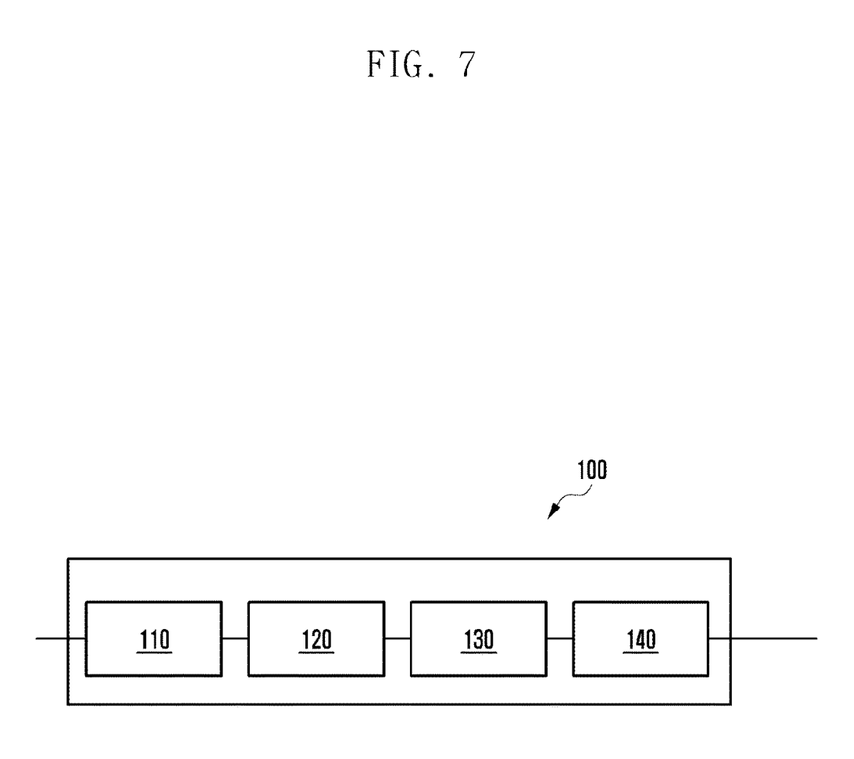
FIG. 7 shows a schematic representation of an example base station according to the present disclosure.

FIG. 7 shows a schematic representation of a base station 100 according to an embodiment of the present disclosure. It comprises a threshold detector 110, operable to detect signals and compare these to the thresholds $γ_{th}$ and $N_{th}$ referred to previously. The results of the comparison are passed to controller 120, which oversees the operation of the base station 100. If a decision is then made to switch modulation scheme, a switch instruction is passed to modulation controller 130, which then generates an appropriate QAM or FQAM signal for onwards transmission by transmitter 140.

Some or all of the functions set out above may be performed by either pure hardware or software modules, as required.

Embodiments of the disclosure advantageously allow network resources to be efficiently divided between different network elements, whilst ensuring orthogonality is preserved. This allows greater resource re-use and permits greater utilization of limited resources, having the effect of maximizing user QoE for a given finite pool of resources.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
a transceiver; and
a controller configured to:
receive, from a first user equipment (UE), a first message including first information on at least one signal-to-interference-plus-noise ratio (SINR) of at least one reference signal, wherein each of the at least one reference signal is transmitted by a different base station on a different resource element,
receive, from a second UE, a second message including second information on at least one SINR of at least one reference signal, wherein each of the at least one reference signal is transmitted by a different base station on a different resource element,
determine a first modulation scheme for the first UE based on the first information on the at least one SINR received from the first UE,
determine a second modulation scheme for the second UE based on second information on the at least one SINR received from the second UE,
performing communicate with the first UE using the first modulation scheme, and
performing communicate with the second UE using the second modulation scheme,
wherein communications with the first UE and the second UE are configured to be substantially orthogonal to each other.

2. The base station of claim 1, wherein the communications are configured to be orthogonal to each other in at least one of time, frequency or spatial domains.

3. The base station of claim 2, wherein orthogonality in the spatial domain utilizes beamforming to steer a first beam at the first UE and a second beam at the second UE, and whereby the first beam uses the first modulation scheme and the second beam uses the second modulation scheme.

4. The base station of claim 1, wherein the controller is configured to determine the first modulation scheme or the second modulation scheme for the first UE according to a switching criterion that is determined either in a centralized manner or in a distributed manner.

5. The base station of claim 2, wherein the base station is configured to determine whether to use the first modulation scheme or the second modulation scheme according to a switching criterion that is determined either in a centralized manner or in a distributed manner.

6. The base station of claim 3, wherein the base station is configured to determine whether to use the first modulation scheme or the second modulation scheme according to a switching criterion that is determined either in a centralized manner or in a distributed manner.

7. The base station of claim 4, wherein the switching criterion is determined using a first threshold test related to the SINR of the at least one reference signal received from the first UE and a second threshold test related to a number of aggressors, and
wherein if both first and second threshold test are satisfied, modulation scheme used in connection with the first UE switches from the first modulation scheme to the second modulation scheme.

8. The base station of claim 1, wherein the first and second modulation schemes are quadrature-amplitude-modulation (QAM) and Feher's QAM (FQAM), respectively.

9. The base station of claim 2, wherein the first and second modulation schemes are quadrature-amplitude-modulation (QAM) and Feher's QAM (FQAM), respectively.

10. The base station of claim 3, wherein the first and second modulation schemes are quadrature-amplitude-modulation (QAM) and Feher's QAM (FQAM), respectively.

11. A method of allocating resources in a communication network by a base station, the method comprising:
receiving, from a first user equipment (UE), a first message including first information on at least one signal-to-interference-plus-noise ratio (SINR) of at least one reference signal, wherein each of the at least one reference signal is transmitted by a different base station on a different resource element;
receiving, from a second UE, a second message including second information on at least one SINR of at least one reference signal, wherein each of the at least one reference signal is transmitted by a different base station on a different resource element;
determining a first modulation scheme for the first UE based on the first information on the at least one SINR received from the first UE;
determining a second modulation scheme for the second UE based on second information on the at least one SINR received from the second UE;
performing communication with the first UE using the first modulation scheme; and
performing communication with the second UE using the second modulation scheme,
wherein communications with the first UE and the second UE are configured to be substantially orthogonal to each other.

12. The method of claim 11, wherein the communications are configured to be orthogonal to each other in at least one of time, frequency or spatial domains.

13. The method of claim 12, wherein orthogonality in the spatial domain utilizes beamforming to steer a first beam at the first UE and a second beam at the second UE, and whereby the first beam uses the first modulation scheme and the second beam uses the second modulation scheme.

14. The method of claim 11, wherein the determining of the first modulation scheme comprises determining the first modulation scheme or the second modulation scheme for the first UE according to a switching criterion that is determined either in a centralized manner or in a distributed manner.

15. The method of claim 12, wherein the base station is configured to determine whether to use the first modulation scheme or the second modulation scheme according to a switching criterion that is determined either in a centralized manner or in a distributed manner.

16. The method of claim 13, wherein the base station is configured to determine whether to use the first modulation scheme or the second modulation scheme according to a switching criterion that is determined either in a centralized manner or in a distributed manner.

17. The method of claim 14, wherein the switching criterion is determined using a first threshold test related to the SINR of the at least one reference signal received from the first UE and a second threshold test related to a number of aggressors, wherein if both first and second threshold test are satisfied, modulation scheme used in connection with the first UE switches from the first modulation scheme to the second modulation scheme.

18. The method of claim 11, wherein the first and second modulation schemes are quadrature-amplitude-modulation (QAM) and Feher's QAM (FQAM), respectively.

19. The method of claim 12, wherein the first and second modulation schemes are quadrature-amplitude-modulation (QAM) and Feher's QAM (FQAM), respectively.

20. The method of claim 13, wherein the first and second modulation schemes are quadrature-amplitude-modulation (QAM) and Feher's QAM (FQAM), respectively.

* * * * *